Patented June 6, 1933

1,913,133

UNITED STATES PATENT OFFICE

HARRY H. STOUT, OF ARDSLEY-ON-HUDSON, NEW YORK, ASSIGNOR TO COPPER DEOX-
IDATION CORPORATION, OF NEW YORK, N. Y., A CORPORATION OF NEW YORK

COALESCENCE OF METALS

No Drawing.     Application filed June 10, 1931. Serial No. 543,394.

This invention is a process by which an aggregate of metallic particles can be coalesced into a solid homogeneous mass.

The invention relates particularly to a process in which the surfaces of the metallic particles are first chemically cleaned by treatment in a bath of suitable liquid, and are thereafter subjected to suitable pressure at a temperature above the recrystallization point and below the melting point of the particles to coalesce the particles. After the surfaces of the particles have been chemically cleaned suitable steps are taken to protect the particles against the reformation of surface impurities that would interfere with successful coalescence.

In my Patent No. 1,822,939 for Process for treating metals I have disclosed a process in which metallic particles are coalesced after they have been cleaned by a gas. The present process is especially suited for coalescing metallic particles which cannot be economically cleaned by action of a gas, for example, particles of metals such as zinc, tin, aluminum, or of alloys such as brass or bronze. The particles may be in the form of shotted tin, electrolytically deposited tin, scrap tin, scrap aluminum, shotted aluminum, scrap zinc, electroylytically deposited zinc, etc. It is preferable that each separate particle of the aggregate be of similar origin and chemical composition in order to produce a product of uniform chemical composition.

As a preliminary step all foreign substances such as grease, dust, etc., should be removed from the surfaces of the particles in any suitable manner. In cases where the particles are composed of scrap, the surface of which has been coated with another metal not desired in the product, for example tinned plate, the metal coating may be removed by any preferred process.

The individual particles of the aggregate are not limited in size and shape except that they must be of a size that can be handled by the apparatus used for the process.

The term "injurious substances" will be used herein to mean chemical compounds, such as oxides, sulphides, sulphates, carbonates, etc., which are present on the surfaces of the particles in sufficient amount to interfere with complete coalescence, or if not present in sufficient amount to interfere with complete coalescence are nevertheless present in sufficient amount to be objectionable in the coalesced product.

In removing injurious substances in the present process the metallic particles are treated with a liquid suitable for removing the particular injurious substance or substances present on the surfaces of the particles. For example, for removing oxides of zinc or tin from the respective metal surfaces, the particles can be treated in a pickling bath of dilute acid. A suitable pickling bath can be provided to remove any particular injurious substance from any particular metallic particles, and the selection of a proper pickling bath for any particular set of conditions is within the knowledge of one skilled in the art.

For economy of handling it will in most cases be advisable to press the particles while cold (at room temperature) into bales or briquettes. In the preferred process this briquetting is done after the particles have been treated in the pickling bath, but it can be done at any suitable stage of the process. The volume density of the briquettes need not exceed that necessary to give the briquette sufficient cohesion to hold together while it is being handled. If the particles are to be coalesced and extruded in the form of tubing, the briquette may be formed with a hole in the center.

After the injurious substances have been removed from the surfaces of the particles, the charge of particles may ordinarily be transferred through the ordinary room atmosphere to the furnace where the next step is to be performed, if the transfer is made without undue delays. But if after cleaning the particles are stored in ordinary atmosphere for a long time the surfaces of the particles will again become contaminated with injurious substances and it will be necessary to again clean the surfaces before proceeding with the process.

In the furnace the particles are heated to the required temperature. During the heating and until the end of the process it is essential that the charge be kept in a non-injurious atmosphere, that is, an atmosphere that will prevent the return of injurious substances to the surfaces of the particles. This non-injurious atmosphere may be any commercial gas which is reducing or neutral to the metallic particles within the range of temperatures used for coalescence. For example, in the cases of tin, zinc, aluminum, brass, or bronze, the atmosphere may consist of suitably dry hydrogen and/or blue water gas and/or any hydrocarbon gas.

A preferred type of heating furnace is the electric furnace now used in the art for annealing metals, with such minor modifications as are necessary to insure being able to maintain the non-injurious atmosphere on the interior of the furnace, as disclosed in my Patent No. 1,822,939.

The charge is now heated to the coalescing temperature, which may be any temperature in the range between the recrystallization point and the melting point of the metallic particles. If a temperature in the higher part of this range is used, a lower coalescing pressure can be used than would be necessary if the temperature were in the lower part of the range. It is preferable when coalescing an aggregate of particles whose melt point is above 1100° F. to use a temperature in the lower part of the range on account of the lesser maintenance cost of the coalescing apparatus. When coalescing an aggregate of metallic particles whose melting point is below 1100° F., it is preferable to use a temperature in the upper part of the range on account of the reduction in the required pressure.

After the charge of particles has reached the temperature desired, it is transferred to a coalescing apparatus. The atmosphere in the coalescing apparatus and the atmosphere through which the charge passes from the furnace to the coalescing apparatus must be a non-injurious atmosphere, as previously explained. A preferred type of coalescing apparatus is the extrusion press disclosed in my Patent No. 1,822,939.

The charge is now subjected to the pressure necessary, at the temperature used, to cause crystal grain growth across all adjacent boundaries of the original metallic particles, thereby coalescing the originally separate particles into a solid homogeneous mass. In the preferred process the mass is extruded from the coalescing press, the coalescing and extruding resulting from a single movement of the press.

Both the temperature and pressure used for coalescing and extruding any aggregate of metallic particles is substantially the same as that now used in the art for extruding cast billets of the same composition. For example, the temperature and pressure now used in the art for extruding 70-30 cast brass billets can be conveniently used for coalescing and extruding an aggregate of 70-30 brass particles.

The coalesced mass may be extruded from the coalescing apparatus in any suitable shape, such as rods, bars, angles, hollow billets, tubing, etc.

A subsequent charge inserted in the press can be coalesced within itself and also to the remaining stub of the previously extruded charge, and then the entire coalesced mass consisting of the stub of the previous charge and the subsequent charge may be extruded in one continuous, homogeneous mass. This process can be carried on indefinitely to produce a single piece of any desired length.

In some cases the economy of the process can be increased by removing injurious substances from the surfaces of the particles and coating them with a minute film of another metal whose presence in the coalesced product is not objectionable. Thus brass or bronze particles may be washed in a pickling bath of a dilute solution of sulphuric acid and copper sulphate. This bath removes oxides of zinc or copper from the surface of the particles and deposits on the particles an extremely thin film of copper whose presence in the coalesced product is in no way objectionable. Particles of tin, zinc, aluminum, steel or iron can be similarly coated with a minute film of copper. Thereafter the coated particles are heated in a non-injurious atmosphere and coalesced as previously explained. The greater economy obtained by copper coating is due to the fact that a cheaper non-injurious atmosphere can be used.

Thus, if brass particles are coated with copper the non-injurious atmosphere can be composed largely of steam with only a relatively small percentage of hydrogen or hydrocarbon gas. This steam-hydrogen atmosphere is non-explosive and perfectly harmless, and is more economical than the atmosphere that would have to be used if the brass surfaces were exposed after cleaning.

The physical characteristics of coalesced and extruded metals or alloys is at least as good as the physical characteristic of metals or alloys of the same composition made by prior art methods of melting and casting, when both are subjected to the same heat treatment and working treatment. For example if one inch diameter annealed brass rods are broken up, coalesced and extruded as one inch diameter brass rods, the extruded rod after annealing will have the same physical characteristics as the one inch parent brass rods.

The physical characteristics of the product obtained by coalescing and extruding any aggregate of metallic particles is generally superior to the product obtained by melting and casting these same particles due to the fact that the particles while in molten condition are effected by contact with the furnace walls and furnace slag.

A product coalesced and extruded from an aggregate of electrolytically deposited metallic particles is the purest form in which the metal can be produced due to the fact that it is not contaminated by contact with furnace walls and furnace slag which occurs when prior art methods of melting and casting it are used.

The grain structure of a coalesced and extruded product, when viewed with a microscope is the same as is seen in prior art produced and worked metal of the same composition. All the boundaries of the original metallic particles are obliterated and the entire coalesced and extruded mass possesses the interlocking crystal formation which characterizes worked metal.

Similarly when a successive charge is inserted and coalesced against the remaining stub of the previous charge the contact face between the stub and the successive charge is entirely obliterated and under the microscope shows the same interlocking crystal formation as all other parts of the extruded product.

The advantages of coalescence and extrusion compared to prior art melting and cast will vary for each metal or metal alloy. For example if 70-30 scrap brass rods are to be reworked into brass rods; the following table shows the steps required by each method:

| My process | Prior art |
|---|---|
| Pickling | Cabbaging |
| Briquetting | Melting |
| Heating | Casting |
| Coalescing and extrusion | Cropping |
| | Heating |
| | Extrusion |

The melting, casting and cropping which are the most expensive steps in prior art are dispensed with and the inexpensive step of pickling is substituted. In addition prior art will obtain about 70% of the original scrap rods as acceptable product and 30% will be scrap to be again remelted whereas in my process I obtain 100% of the original scrap rods as acceptable product.

I claim:

1. The method of producing a solid metallic mass from an aggregate of smaller metallic particles, which consists in treating the metallic particles in a pickling and coating bath to remove injurious substances and cover the metallic particles with a coating of a coalescable metal different from the average metal composition of the particles, transferring the particles to a furnace, thereafter and until the end of the process maintaining the particles in an atmosphere non-injurious to the coating metal, heating the particles to a temperature between the recrystallization point and the melting point of the particles, and subjecting them to pressure sufficient to coalesce all the individual particles into a cohesive mass having crystal grain growth across all adjacent boundaries of the original metallic particles.

2. The method of producing a solid metallic mass from an aggregate of smaller metallic particles, which consists in treating the metallic particles in a pickling and coating bath to remove injurious substances and cover the metallic particles with a coating of a coalescable metal different from the average metal composition of the particles, said coating metal being one which can be treated with a cheaper non-injurious atmosphere than can the uncoated metallic particles, transferring the coated particles to a furnace, thereafter and until the end of the process maintaining the particles in an atmosphere non-injurious to the coating metal, heating the particles to a temperature between the recrystallization point and the melting point of the particles, and subjecting them to pressure sufficient to coalesce all the individual particles into a cohesive mass having crystal grain growth across all adjacent boundaries of the original metallic particles.

3. The method of producing a solid metallic mass from an aggregate of smaller particles which contain a metal other than copper, which consists in treating the metallic particles in a pickling and coating bath to remove injurious substances and cover the metallic particles with a coating of copper, transferring the particles to a furnace, thereafter and until the end of the process maintaining the particles in an atmosphere non-injurious to copper, heating the particles to a temperature between the recrystallization point and the melting point of the particles, and subjecting them to pressure sufficient to coalesce all the individual particles into a cohesive mass having crystal grain growth across all adjacent boundaries of the original metallic particles.

4. The method of producing a solid metallic mass from an aggregate of smaller particles which contain a metal other than copper, which consists in treating the metallic particles in a dilute solution of sulphuric acid and copper sulphate to remove injurious substances and cover the metallic particles with a coating of copper, transferring the particles to a furnace, thereafter and until the end of the process maintaining the particles in an atmosphere non-injurious to copper, heating the particles to a temperature between the recrystallization point and the melting point of the particles, and subjecting them to pressure sufficient to coalesce all the individual particles into a cohesive mass having crystal grain growth across all adjacent boundaries of the original metallic particles.

HARRY H. STOUT.